United States Patent
Bera

(10) Patent No.: US 6,829,760 B1
(45) Date of Patent: Dec. 7, 2004

(54) RUNTIME SYMBOL TABLE FOR COMPUTER PROGRAMS

(75) Inventor: Rajendra Kumar Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 09/643,572

(22) Filed: Aug. 22, 2000

(51) Int. Cl.$^7$ ................................................ G06F 9/45
(52) U.S. Cl. ........................................ 717/142; 717/143
(58) Field of Search ................................. 717/140–143, 717/151, 153, 154, 162–167; 709/330–332

(56) References Cited

U.S. PATENT DOCUMENTS

| | | | |
|---|---|---|---|
| 5,548,761 A | * 8/1996 | Balasundaram et al. | .... 717/147 |
| 5,778,231 A | 7/1998 | van Hoff et al. | |
| 5,809,306 A | * 9/1998 | Suzuki et al. | ................ 717/154 |
| 6,298,481 B1 | * 10/2001 | Kosaka et al. | .............. 717/162 |

OTHER PUBLICATIONS

Alfred V. Aho, et al., "Compilers: Principles, Techniques, and Tools," 1988, Addison–Wesley, pp. i, ii, vii–x, 60–78, 429–440.*

Vasanth Bala, et al., "Explicit Data Placement (XDP): A Methodology for Explicit Compile–Time Representation and Optimization of Data Movement," 1993, Proceedings 4$^{th}$ ACM SIGPLAN symp. on Principles & practice of parallel programming, v.28 i.7, pp 139–148.*

Alexander D. Stoyenko, "SUPRA–RPC: SUbprogram PaRAmeters in Remote Procedure Calls," Dec. 1991, Third ACM/IEEE Symposium on Parallel Distributed Computing, Dallas, Texas, pp. 620–627.*

* cited by examiner

*Primary Examiner*—Tuan Dam
*Assistant Examiner*—Eric B. Kiss
(74) *Attorney, Agent, or Firm*—Manny W. Schecter; T. Rao Coca; Anthony V. S. England

(57) ABSTRACT

A method 100, an apparatus, and a computer program product for constructing a runtime symbol table SymTbl[ ] for a computer program are disclosed. In the method, a symbol table SymTbl[ ] for storing one or more entities $E_i$ is initialized 110. One or more tickets $T_i$ are then added 120 into the symbol table SymTbl[ ] for each entity $E_i$ that does not already exist in the symbol table SymTbl[ ]. An offset address is then inserted 130 after a predefined token ">" for each ticket $V_i$ in a predefined set V of tickets in the symbol table SymTbl[ ] characterized as a sequence of the tickets $V_i$. One or more preassigned addresses are also inserted 140 in the symbol table SymTbl[ ] for each ticket $V_i$ in the set V of tickets that has preassigned addresses.

60 Claims, 3 Drawing Sheets

RUNTIME SYMBOL TABLE FOR COMPUTER PROGRAMS

FIELD OF THE INVENTION

The present invention relates generally to the field of computer programing and more particularly to compiler systems and runtime systems.

BACKGROUND

Conventional symbol tables are constructed during the compilation of a computer program to keep track of constants, variables, functions, key words, and the like in a program and to allocate pointers to (or addresses of) memory locations from where they can be accessed during program execution. Examples of known methods for creating such symbol tables are described by Aho, A. V., Sethi, R., and Ullman, J. D., *Compilers: Principles, Techniques, and Tools,* Addison-Wesley Publishing Co., Reading, Mass., 1986, at pp. 11, 60–62, 84, 160, 429–440, 473, 475–480 and 703, and Pyster, A. B., *Compiler Design and Construction,* $2^{nd}$ ed., Van Nostrand Reinhold, N.Y., 1988 at pp. 21, 170–172, 182 and 203–204. During the execution of a program, these symbol tables are usually abandoned.

One of the elementary steps in the compilation of a program is to scan the program character by character and pick up key words, numerical constants, operators, variable names, function names, etc. Of these, the constants, variable names, and function names must be assigned addresses in memory from where their values or execution sequence can be picked up. Again, the allocation of these addresses is facilitated by the construction of a symbol table. The symbol table stores information such as the name of the variable or function, its data type, its address, if assigned, and so on. Conventional methods usually have an algorithm that decides how the symbol table is to be populated with the principal objective of being able to determine quickly if a particular entity already exists in the symbol table or not. Certain computational and memory overheads are incurred in such conventional processes, but the overheads are considered worthwhile when programs have a large number of entities for which memory allocations must be made. Such conventional techniques were developed in an era when resources such as CPU cycles, memory space, and the like were scarce and consequently had to be used parsimoniously.

Existing optimizing compilers are complex software products and their abilities are quite limited, especially in reorganizing data to improve cache hits. Such compilers frequently attempt to rearrange the code through such means as rearranging nested loops, constant propagation, common subexpression elimination, moving invariant "if" code out of loops, etc. However, expert human programmers often do much better than optimizing compilers by clever handling of loops and distribution of data in memory because of their additional insight and knowledge about the domain to which the program belongs.

U.S. Pat. No. 5,778,231, issued on 7 Jul. 1998 to van Hoff et al., describes a program compiler that identifies symbols in program source code that references another program. The compiler then determines whether or not the symbol is a reference to a file that is located remotely or locally. If the symbol refers to a remotely located file, the compiler constructs a URL and retrieves, if possible, relevant portions of the compiled program or original source code referred to by the symbol. If the symbol refers to a locally located file, similar operations are preformed. The compiler described by U.S. Pat. No. 5,778,231 attempts to resolve symbols that reference another program in this matter during compilation. The compiler essentially, deals with the problem of gathering, at one place, pieces of a program distributed over a network of computers and integrating the pieces for compilation. U.S. Pat. No. 5,778,231 is directed entirely to compilation of computer programs and does not teach or suggest any post-compilation activities.

A major disadvantage of such conventional approaches is that committed decisions for optimal runtime execution are taken at compile time, thereby depriving the runtime system of utilising optimising opportunities as they arise during the execution of a program.

Thus, a need clearly exists for an improved technique of using symbol tables of computer programs for use by compilers and runtime systems.

SUMMARY

In accordance with a first aspect of the invention, there is provided a method for constructing a runtime symbol table for a computer program, the method including the steps of:

initializing a symbol table for storing one or more entities;

adding into the symbol table one or more tickets for each entity that does not already exist in the symbol table;

inserting an offset address after a predefined token for each ticket in a predefined set of tickets in the symbol table characterised as a sequence of the tickets; and inserting one or more preassigned addresses in the symbol table for each ticket in the set of tickets that has preassigned addresses.

Preferably, the symbol table is a string of characters.

Preferably, the adding step further includes the step of searching the symbol table to determine if the symbol table already contains an entity. Still more preferably, the adding step further includes the steps of creating a ticket and concatenating the ticket with the symbol table. Yet more preferably, the adding step further includes the step of generating placeholders for each ticket to store incomplete information in the symbol table.

Preferably, the method further includes the step of, before the adding step, mapping an entity name for each of one or more entities having the same entity name as another entity name into a unique entity name for placement in the symbol table. The mapping can, be performed by a precompiler.

Each entity is selected from the group consisting of: a constant; a variable; a pointer; a function name; and a procedure name.

Each ticket includes an entity name and at least one tagged address. The ticket further may include at least one tag for specifying information regarding the corresponding entity. The at least one tagged address is selected from the group consisting of an entity home address, an entity offset address, and a copied address. Optionally, the at least one tagged address can be allocated dynamically by a runtime system.

Preferably, the method further includes the step of copying a tagged address in a ticket of an entity to enable optimisation of memory accesses of the entity. More preferably, the method further includes the step of deleting a tagged address in a ticket of an entity.

Optionally, the method includes the step of generating an error message using the runtime symbol table when an error occurs.

In accordance with a second aspect of the invention, there is disclosed an apparatus for constructing a runtime symbol table for a computer program, the apparatus including:

a device for initializing a symbol table for storing one or more entities;

a device for adding into the symbol table one or more tickets for each entity that does not already exist in the symbol table;

a device for inserting an offset address after a predefined token for each ticket in a predefined set of tickets in the symbol table characterised as a sequence of the tickets; and a device for inserting one or more preassigned addresses in the symbol table for each ticket in the set of tickets that has preassigned addresses.

In accordance with a third aspect of the invention, there is disclosed a computer program product having a computer readable medium having a computer program recorded therein for constructing a runtime symbol table for a computer program, the computer program product including:

a computer program code module for initializing a symbol table for storing one or more entities;

a computer program code module for adding into the symbol table one or more tickets for each entity that does not already exist in the symbol table;

a computer program code module for inserting an offset address after a predefined token for each ticket in a predefined set of tickets in the symbol table characterised as a sequence of the tickets; and a computer program code module for inserting one or more preassigned addresses in the symbol table for each ticket in the set of tickets that has preassigned addresses.

In accordance with a fourth aspect of the invention, there is described a method of operating a runtime system, the method including the steps of:

loading a computer program having an associated runtime symbol table, the runtime symbol table containing a ticket for each of at least one entity of the computer program, the ticket including at least one tagged address;

dynamically allocating a memory address for the entity and recording the allocated memory address in the ticket.

Preferably, the symbol table is a string of characters for storing information about the at least one entity, the ticket of each of the at least one entity including an offset address after a predefined token. Each ticket includes one or more placeholders for storing incomplete information in the symbol table.

Preferably, the method further includes the step of generating a unique entity name for each like named entity in the computer program before entering the entity in the symbol table. The named entities can be of dissimilar scope notwithstanding being like-named.

Each entity is selected from the group consisting of: a constant; a variable; a pointer; a function name; and a procedure name.

Each ticket includes an entity name and at least one tagged address, and at least one tag for specifying information regarding the corresponding entity.

In accordance with a fifth aspect of the invention, there is disclosed an apparatus for operating a runtime system, the apparatus including:

a device for loading a computer program having an associated runtime symbol table, the runtime symbol table containing a ticket for each of at least one entity of the computer program, the ticket including at least one tagged address;

a device for dynamically allocating a memory address for the entity and recording the allocated memory address in the ticket.

In accordance with a sixth aspect of the invention, there is described a computer program product having a computer readable medium having a computer program recorded therein for operating a runtime system, the computer program product including:

a computer program code module for loading a computer program having an associated runtime symbol table, the runtime symbol table containing a ticket for each of at least one entity of the computer program, the ticket including at least one tagged address;

a computer program code module for dynamically allocating a memory address for the entity and recording the allocated memory address in the ticket.

BRIEF DESCRIPTION OF DRAWINGS

Embodiments of the invention are described hereinafter with reference to the accompanying drawings, in which.

DETAILED DESCRIPTION

Figure 1:
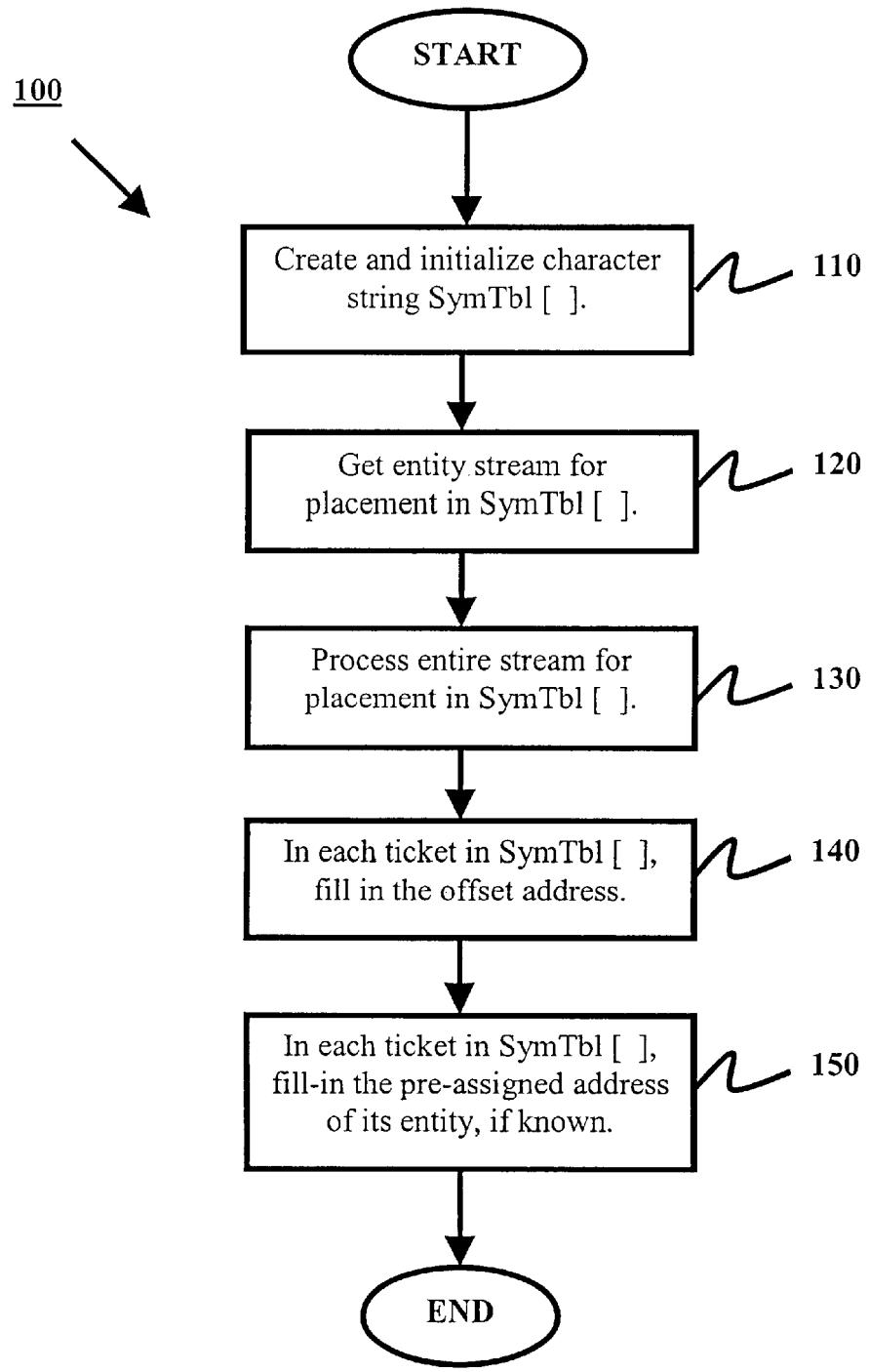
FIG. 1 is a flow diagram of a process for constructing a runtime symbol table in accordance with a first embodiment of the invention.

A method, an apparatus, and a computer program product for building a runtime symbol table are described. In the following description, numerous details are set forth including computer programming languages. It will be apparent to one skilled in the art, however, that the present invention may be practised without these specific details.

The detailed description is organised as follows:

1. Overview
2. Process of First Embodiment
3. Use of Tagged Addresses
4. Address Creation and Deletion
5. Error Handling Via the Runtime Symbol Table
6. Advantages
7. Computer Implementation In the following description, components of the method for building a runtime symbol table for a computer program are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

1. Overview

The method according to the embodiments of the invention generates a runtime symbol table in the form of a long character string and uses string manipulations for construction of the symbol table. The runtime symbol table, as the name implies, is available to the program during execution unlike conventional symbol tables that are usually discarded after compilation of a computer program. The presence of a runtime symbol table advantageously enables, inter alia, dynamic memory allocations to be made, memory allocations to be optimized to maximize cache hits, and checks to be performed on memory leakage, illegal memory allocations and deallocations, array bounds, and the like. The method can be readily implemented in computer software.

The method according to the embodiments of the invention breaks away from conventional approaches of using resources (memory, CPU cycles, etc.) parsimoniously. Instead, the method capitalizes on the fact that such resources are easily, and perhaps abundantly, available today, and are expected to be more so in the future. A significant application of the runtime symbol table is in the design of compilers and runtime systems of supercomputers. In such systems, the system needs to be able to be dynamically reconfigured due to a changed runtime environment, e.g. because of processor failures, channel failures, etc. The method of the embodiments also has applications in managing routing tables of networks.

The method of the embodiments of the invention produces a runtime symbol table that can be built by a suitably constructed program editor and used, updated and manipulated by compilers and runtime systems.

2. Process of First Embodiment

The method according to the embodiments of the invention is readily implemented and structured to be usable during runtime to fulfil a variety of needs, such as dynamic memory allocations to meet a desired optimality criterion.

The method requires that for each entity $E_i$ (such as a variable, function, constant, etc.) seeking placement in the symbol table an encoded ticket $T_i$ with additional information on $E_i$ must be created prior to placement. For example, a function name could be followed with tags that provide information about the number of arguments and their data types, function return type, size of memory to be allocated, etc. Also, during program development, functions can be tagged, among other things, to denote whether the function is trustworthy or not. A variable may be treated similarly by noting that a variable can be viewed as a function having a return type and tags such as whether the return type is an array, pointer, etc. Likewise, a constant may be viewed as a defacto variable having only three tags: a constant, the data type of the constant, and size of memory to be allocated to the constant.

While the ticket $T_i$ may be formatted in a variety of ways, the syntax stated in Table 1 is preferred. However, changes to this format can be made without departing from the scope and spirit of the invention.

TABLE 1

":entityname tag1 tag2 . . . tagn >addr >Maddr . . ."

The label entityname is the name of an entity such as a function, a variable, a constant, etc. The labels tag1, tag2, and so on carry additional information on the entity.

Note that, in the representation of Table 1, a colon is placed just before the entityname and a blank precedes and succeeds each tag. The colon indicates that whatever is attached to its right, delimited by a blank, is an entity name. The character ">" is used to indicate that whatever is attached to its right, delimited by a blank, is an address, usually tagged at beginning of the delimited text with a qualifying character such as M (memory) in the above example. Other address tags may be devised and used depending upon the entities permitted by the programming language and the requirements of the runtime system in processing the address tags while executing computer programs. The significance of the address tags are further explained hereinafter.

Any ticket $T_i$ must have provisions for >addr (the entity's offset address) and >Maddr (the entity's home address). Provision for storing additional tagged addresses, if any, must be made in ticket $T_i$ when the ticket is created and all such addresses follow >Maddr without any heed to their sequence. Note that for each address, there is a preceding blank before its corresponding ">" and a following blank after the address itself.

Modern programming languages allow multiple entities to have the same entityname provided their scopes within the program are clearly separable, such as where the entity appears in different program blocks, functions, etc. To ensure that confusion does not arise between such identically named entities, each of these entities in the program is mapped to a unique name by a precompiler before any attempt is made to place the entity in the symbol table. The symbol table and the program subsequently knows the entity by the mapped name of the entity. Henceforth, the entityname is assumed to be the uniquely mapped name of the entity.

FIG. 1 is a flow diagram illustrating the process 100 of constructing a symbol table in accordance with the first embodiment of the invention. In step 110, a character string is created and initialized. The string SymTbl [ ] has a predetermined size that is reasonable for the program. For example, the predetermined size may be 1 Kbytes per 1K lines of program code. However, other sizes can be practised without departing from the scope and spirit of the invention. The string can be resized easily, for example, by calling a function similar to the realloc ( ) function of C during the construction of the runtime symbol table. Thus, if the size is underestimated, the string can be resized later. SymTbl is also initialized so that the first character in the string is a blank, and the second character is an end-of-string (NULL) character.

In step 120, an entity stream is obtained for placement in SymTbl [ ]. In particular, E is the set of entities, $E_1, E_2$ . . . coming in a sequence for possible placement in the symbol table. In step 130, the entire stream of entities is processed for placement in the symbol table. Step 130 is shown in greater detail in FIG. 2.

Figure 2:
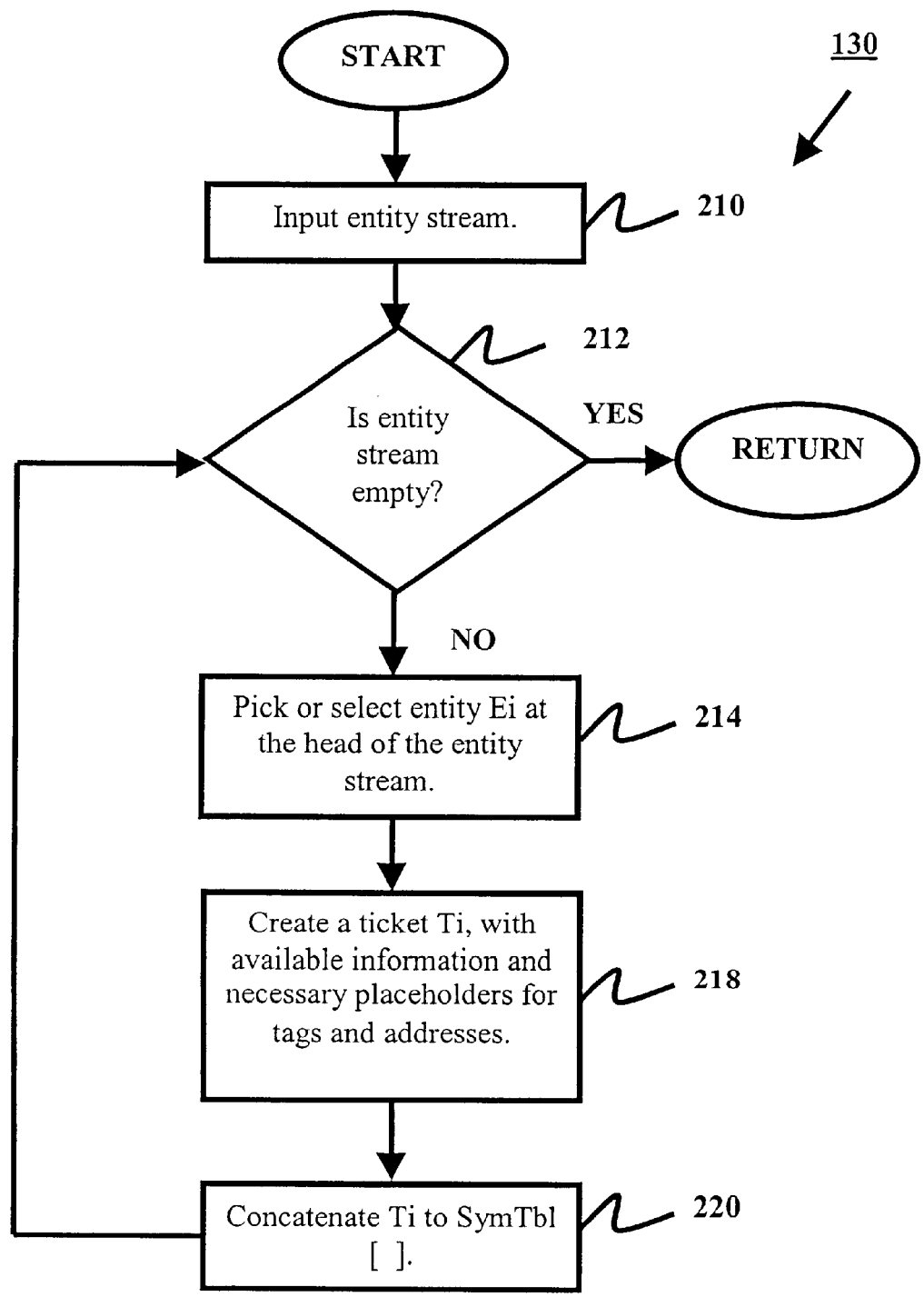
FIG. 2 is a more detailed flow diagram of step 120 shown in FIG. 1.

Processing in FIG. 2 begins at step 210. In step 210, the entity stream is input. In decision step 212, a check is made to determine if the entity stream is empty. If decision step 212 returns true (yes), processing returns to the calling procedure of FIG. 1. Otherwise, if decision block 212 returns false (no), processing continues at step 214.

In step 214, an entity $E_i$ is picked or selected from the head of the entity stream. In step 218, a ticket $T_i$ is created, using available information and necessary placeholders for tags and addresses. In step 220, the ticket $T_i$ is concatenated to the symbol table SymTbl[ ]. Processing then continues at decision step 212.

Thus, with reference to FIG. 2, for the first entity $E_1$, a ticket $T_1$ is created and concatenated to SymTbl. Note that $T_1$ and all subsequent tickets created in this step have incomplete information. For example, none of the addresses are known and some of the tag entries may not be known, such as the memory block size required by the entity. For all such missing information an appropriate number of blank spaces at their designated places in $T_1$ are kept as placeholders for the information to be filled in when the information becomes available. Also, the character ">" is put in place corresponding to >addr. For all subsequent entities $E_i$, i>1, the SymTbl is searched for the entity's corresponding ":entityname" substring (e.g. using the strstr ( ) function in C). Note the presence of a blank character following the entityname permits it to be searched for unambiguously. For example, if entityname="this_var", then a search for the substring ":this_var " finds the entity unambiguously without getting confused with, say, another entityname such as "this_var_name". The entity $E_i$ is ignored if the entity already exists in SymTbl. Otherwise, the corresponding (incomplete) ticket $T_i$ is created and concatenated to SymTbl. When no more entities are waiting to be processed, processing continues at step 140 of FIG. 1.

Optionally, no attempt is made to search SymTbl efficiently nor are any addresses allocated. Since such a symbol table can be generated (at the user's discretion) at the end of an editing phase of a program and before the file is saved and closed, such efficiency is not necessary. This symbol table can be attached to the program and later used by the compiler. The task of creating the symbol table can be moved away from the compiler and handed over to the program editor.

In step 140, the offset address is filled in for each ticket in symbol table. V is the set of all the tickets placed in the symbol table SymTbl, and $V_i$ is the i-th ticket in V such that the sequence $V_1, V_2, \ldots, V_n$, where n is the total number of tickets in V representing the sequence in which the tickets appear in SymTbl. In each $V_i$, the character ">" is located and immediately after the token is placed the offset address (with respect to the starting address of SymTbl) of the character position of the following blank. This offset address is $S_i$. Thus $S_i-1$ refers to the first ">" of $V_i$. $S_i$+runtime_address_of(SymTbl) provides the address where $S_i$ is actually stored in memory at runtime. Obviously, no two $S_i$'s can be the same.

In step 150, the preassigned address of an entity, if known, is filled in in each ticket of the symbol table. Preassigned addresses are prefixed with the substring ">M". The resulting ">Maddr" is put in its appointed place in the ticket. Thus the absence of the substring ">M" in a $V_i$ indicates that the ticket's entity has not yet been assigned a runtime address.

The reason why the $V_i$s have generally not been assigned their respective entity's >Maddr so far is to allow the runtime system to dynamically allocate memory to meet one or more runtime criteria, say, the need to maximize cache hits during execution. Using the compiler's static analysis and the available runtime environment, optimal >Maddr allocations can be attempted for the entities just before execution begins, and modified later during runtime, if desired.

During compilation, the compiler has a readily available symbol table. The compiler can refer to the entity which a $V_i$ represents by its offset address $S_i$, which also serves as a marker from where the runtime system can search for the actual address of the entity required during execution. The actual address is one of the tagged addresses in $V_i$. The search for a tagged address is easily effected by first going to $S_i$. (In C and C++ programming languages, this can be done using strstr(SymTbl, ">$S_i$"), for example). The substring ">?" is searched for between $S_i$ and the next ':', where the character "?" in the substring represents one of the permissible tag characters, such as M (and others described later), and the address attached to this substring is found.

A principal reason for creating the runtime symbol table is to delegate address allocations to the runtime system. During compilation the compiler treats $S_i$ as the address of $E_i$. Only the runtime system dynamically allocates addresses and appropriately places those addresses in the runtime symbol table on the fly. Those addresses are used during execution. Another principal reason for creating the runtime symbol table is to make the symbol table the central repository of the current status of all the symbol table resident entities in the program.

An advantage of the method according to the foregoing embodiment is that the table entries can be made of variable length at the time of an entity's creation, but held fixed for an entity once created. The tickets can be easily tokenized for future processing and the tickets can be reordered by creating an index vector on the character ':' for each type of reordering. Appropriate reorderings facilitate the identification of groups of entities which can be used to dynamically reallocate/deallocate or reorganise memory pools for optimal use of cache memories during program runs. It is far easier to make cache optimizations by manipulating the symbol table through algorithms during a run than to delve into the source code, modify its variable declarations, do loop restructuring, etc., as is presently done by optimizing compilers. For example, such manipulations are described in Wolfe, M., *High Performance Compilers for Parallel Computing,* Addison-Wesley, 1996. The symbol table can be manipulated, if necessary, on the basis of runtime statistics being collected during a run through appropriately designed algorithms. Indeed, a previous run's statistics can be used to reorganize the memory pool (heap) for the next run by means of assigned tagged addresses in the symbol table (in which case recompilation of the code can be avoided). The symbol table, along with checkpointing facilities, can provide considerable flexibility in dealing with changes in the runtime environment, such as processor failures, channel failures, etc., by reassigning the tagged addresses.

All searches on the symbol table can be made using only the strstr ( ) function, and reordering of the tickets can be done through the use of pointers. The number of entities in the symbol table is equal to the number of ":" in the symbol table. The formatting of the tickets and the symbol table was designed to ease coding of the compiler and the runtime system.

2.1 Matrix Applications: an Example of Opportunism

In many scientific and engineering programs, intelligent handling of matrices during runtime can make large differences in the execution of the program. Since this situation is important and occurs frequently, matrix handling is used as an example to demonstrate the introduction and use of. tagged addresses other than >Maddr and >Caddr.

Two matrix operations are of particular importance: the transpose and the inverse of a matrix. For a matrix, the sequence of elements that are placed in cache lines are different for the matrix and its transpose. The following example shows clearly the consequence of this. Consider the simple matrix multiplication example C=A×B. Table 2 includes pseudocode fragment to process this multiplication and is referred to as "Case 1".

TABLE 2

```
for i = 1 to n do
    for j = 1 to n do
        for k = 1 to n do
            C[i,j] = C[i,j] + A[i,k]*B[k,j]
        endfor
    endfor
endfor
```

The matrix multiplication program is an interesting example because loops can be reordered in any way and still give the same answer. This program works fine if A, B, C, are all in the cache during execution. However, when the matrices are not so (e.g., when the matrices are large), the loop arrangement shown in Table 3 (i.e., Case 2) works better (assuming row major layout of arrays in memory):

TABLE 3

```
for i = 1 to n do
    for k = 1 to n do
        for j = 1 to n do
            C[i,j] = C[i,j] + A[i,k]*B[k,j]
        endfor
    endfor
endfor
```

In this arrangement, the elements B[k, j] are more likely to be in the cache than in Case 1 shown in Table 2, where the elements are more likely not to be found. This is an example where spatial locality is improved by reordering loops so that all the memory references are stride-1. That is, the memory references refer to consecutive memory locations in the inner loop. On the other hand, Case 1 of Table 2 works well if in the statement:

$$C[i,j]=C[i,j]+A[i,k]*B[k,j],$$

instead of B, its transpose (say BT) had been used and the statement written as:

$$C[i,j]=C[i,j]+A[i,k]*BT[j,k],$$

in which event loop reordering can be eliminated. This is desirable because, unlike in the example, loop reordering may change the semantics of the bodies of the affected loops, in which case loop bodies also have to be altered.

In fact, multiplication and inverse operations are common in engineering program code and are computationally intensive. It makes sense to have these operations handled efficiently by the runtime system rather than by the programmer so that programmers can write and modify program code without constantly worrying about runtime efficiencies. Many programmers or coders of scientific and engineering program code have experienced the dismay that a seemingly simple modification can make execution of program code slow down to a crawl.

A well designed matrix class can alleviate the problem by making provisions so that whenever the runtime system encounters a multiplication A*B, the runtime system automatically searches the symbol table to see if B has a >Taddr. Taddr (T for transpose) is the address where the transpose of B is stored. If the entity B has a >Taddr, the runtime system automatically obtains the transpose from the memory location saved in >Taddr. Otherwise, the runtime system creates both a transpose and a >Taddr of B and then proceeds with the multiplication. The transpose of B is held in memory until such time that the runtime system makes a change in B. At which time the entity B's >Taddr is removed from the symbol table. If the transpose has been created by the runtime system and not by a programmed instruction in. the program, the transpose is also destroyed. The advantage of this scheme is that transposes are created when the transposes are needed and destroyed as soon as the transposes become invalid, but in the intervening period the transposes can be opportunistically used by the runtime system. If the programmer calls a matrix transpose function and a >Taddr exists for the matrix transpose function, the transpose does not need be calculated, but can be directly copied to the required address in memory, if necessary.

Matrix inversion can be performed in like manner. The address of the inverse can be tagged with an I and a >Iaddr placed in the runtime symbol table. >Iaddr can be deleted when no longer needed. Opportunistic provisioning of Taddr and Iaddr allows efficient handling of matrix expressions in a program if a matrix class has been appropriately created. The matrix can then choose a suitable algorithm for handling a matrix operation, which is important for large matrices. For example, during a run depending upon available resources (e.g., number of processors, free memory, etc.), the compiler can work out a preemptive list of variables on which the runtime system can work to manage the flow of data to the cache. Such an arrangement takes away the problem of dealing with the runtime efficiency of most matrix-based engineering application program code from the hands of domain experts, who often ineffectively double up as programmers, and place the problem in the hands of systems software designers, where the problem belongs.

Sometimes situations may arise where, in a ticket $V_i$, some of the tagged addresses turn out to be the same as the home address. Possible examples of such situations are a symmetric matrix having a transpose that is the same as itself so that Taddr=Maddr, or a matrix having an inverse that is itself so that Iaddr=Maddr. Whenever the runtime system refers to a tagged address other than Maddr or Caddr, the runtime system also automatically checks if the tagged address is the same as Maddr. If the tagged address is the same, the runtime system acts as if dealing with a Maddr (that is, the runtime system looks for a Caddr). Otherwise, the runtime system obtains data from the address contained in the tagged address.

None of the new tagged addresses can be created unless the home address is already in place. All tagged addresses, except the home address, are essentially temporary. Therefore, during runtime if memory needs to be freed on demand, memory blocks held by these temporary tagged addresses can be freed, on the basis of predefined rules, by the runtime system itself.

Examples of predefined rules for releasing memory blocks pointed to by a temporary tagged address include:

(1) release if none of the contents of the memory block is currently in cache memory;

(2) release if the memory block is infrequently referred to;

(3) release if recomputing the contents of the memory block is not compute intensive (for example, computing a matrix inverse is much more compute intensive than computing a matrix transpose); etc.

In modern computers, memory size is seldom a major constraint and is expected to be less so in the future. Consequently, tagged addresses can be created and used with great effectiveness with the matrix datatype to opportunistically create copies, transposes, inverses, and the like of a matrix variable and store these entities in a real or virtual memory pool. Clearly, similar tactics can be used on other data types, especially on database records.

3. Use of Tagged Addresses

The runtime symbol table created in accordance with the embodiments can considerably augment the efforts of an optimizing compiler by enabling the runtime system to dynamically reorganize data in memory and thus eliminate the need for hand-coded optimization.

To give a rather trivial example of this, cache hits for scalar variables, when the scalar variables are widely distributed in memory, can be improved by creating copies of the variables during runtime and pooling them into a group so that the variables fit into fewer cache lines. The pooling can be done by the runtime system, and the address of each of the variables in the pool is placed in its respective $V_i$ as a >Caddr. The tag "C" indicates that the address Caddr contains a copy of the contents of Maddr. The symbol table is searched for all other copies of >Maddr (if found, the copies are the current aliases of entity $E_i$). In the tickets where copies of >Maddr are found, a copy of >Caddr is placed in those tickets too.

The tagged system works as follows. The only address that the runtime system first uses to locate an entity is the offset address saved in >addr. When the offset address is reached (the address is inside the ticket for the entity), the runtime system looks for a >Caddr in the ticket. If >Caddr exists, the runtime system uses the contents of the address saved in >Caddr. If >Caddr is not there and the runtime system has not determined that a copy is desirable, the contents of the address saved in >Maddr are used. If the runtime system decides that a copy should be created and memory is available, a >Caddr is created and the contents of the address saved in >Maddr are copied into the address saved in >Caddr. Immediately, in the symbol table, all other tickets which have a copy of >Maddr also receive a copy of >Caddr. The contents of the address saved in >Caddr are then used during execution instead of the contents of the address saved in >Maddr. If memory is not available, the contents of the address saved in >Maddr are used. Note that if a >Caddr exists then the address saved in >Caddr always contains the most recent value assigned to the entity, while the contents of the address saved in >Maddr may be stale. Only when >Caddr is to be deleted, for whatever reason, are the contents of the address saved in >Caddr copied into the address saved in >Maddr, and all copies of >Caddr in the symbol table removed. The address saved in >Maddr is referred to as the home address, and the address saved in >Caddr is the copy address of an entity.

4. Address Creation and Deletion

Except for the home addresses placed in the symbol table at the time of creation of the symbol table, all other addresses are assigned by the runtime system. Programming languages allow programmers to allocate and deallocate memory to variables, such as by the new ( ) and delete ( ) functions in C++. It is beneficial to have such addresses tagged by the letter N (for example) rather than M to denote that the address was created under program coder instruction. The runtime system on encountering the new ( ) operator first checks if the targeted variable already has an N-tagged address. The runtime system raises an exception if the targeted variable has. Otherwise, an address is allocated and an >Naddr is placed in the place reserved for >Maddr, overwriting >Maddr, if necessary. Similarly, on encountering the delete ( ) operator, the runtime system can check if the address being deleted has the N-tag. If the address does not, an exception is raised. Otherwise, the address is deleted along with all other copies of this address in the symbol table (found by a strstr ( ) operation in C++), irrespective of the tag.

This simple tagging of addresses eliminates the problem of memory leak and a host of other memory related bugs. Java is not needed to protect program coders from misusing address pointers. Also, at any time, the runtime system knows if a variable has been assigned an address or not. If it has not, then the placeholder for >Maddr is blank. The important point is that having a runtime symbol table under the control of the runtime system allows significant program debugging capability to be built into the runtime system in a natural way.

5. Error Handling Via the Runtime Symbol Table

The fact that each $S_i$ contains a unique offset address allows $S_i$ to be used as an alias for the entity $E_i$. Thus, when the runtime system hits an error involving the offset address $S_i$, the runtime system seeks out $S_i$ in the SymTbl, searches to the left of $S_i$ for a ':' to get the entity's name and from there proceeds to get all other information on $S_i$ contained in ticket $V_i$. A search of the address strings >Maddr (or >Naddr), >Caddr in $V_i$ in all the other tickets in V reveal all the current aliases of $V_i$, if any. The error message can then be constructed to provide a detailed report on the entities, including aliases, involved in the error.

6. Advantages

The runtime symbol table according to the embodiments of the invention permits novel ways of dealing with programs, including the compilation and execution of programs in a resource-rich environment. Among the advantages are:

1. Redistribution of work load among program editors, compilers, and runtime systems.
2. Syntax and type checking, and creation of the runtime symbol table by the program editor, thereby considerably reducing the complexity of compiler designs.
3. Compilers may concentrate only on static optimization of program code and prepare hints and directives for the runtime system for data reorganization.
4. The runtime system can concentrate on managing data flow.
5. Error handlers and debuggers can provide detailed messages by drawing upon the information stored in the runtime symbol table on the current state of the program.
6. Domain experts can concentrate on the task of writing semantically correct programs without worrying about execution efficiencies.

The implementation of a runtime symbol table requires compilers and runtime systems to be designed differently in accordance with embodiments of the invention, instead of conventional approaches.

In terms of hardware, the runtime symbol table can be implemented efficiently if the entire symbol table sits in cache during program execution. Therefore, cache designs should be changed or modified to provide a separate cache for the runtime symbol table in addition to the instruction, data, and other caches already present.

Given that the implementation of the runtime symbol table heavily depends on string operations, a core set of these operations is preferably hardwired in the CPU chip. A memory copy with stride instruction is useful, say for transposing a matrix, extracting column vectors from an array, etc.

The embodiments of the invention enable the runtime system to dynamically optimise the execution of a code depending upon available computing resources, past runtime histories, etc. without the program having to be recompiled by expanding the role and persistence of the symbol table. Also, the creation of the symbol table can be initiated by a precompiler tool, such as a program editor, rather than the compiler itself, thereby reducing the complexity of the design of the compiler.

Computer Implementation

Figure 3:
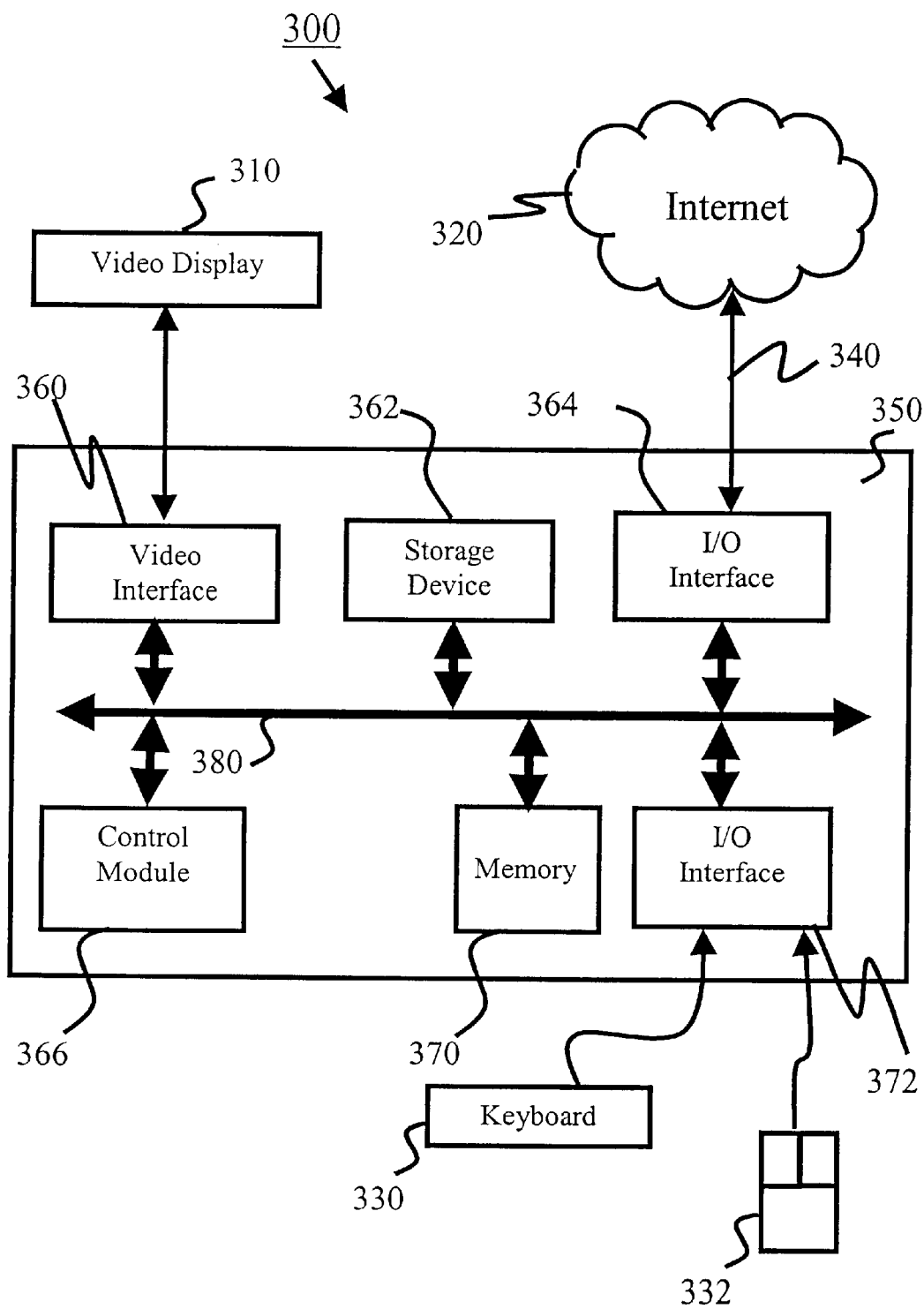
FIG. 3 is a block diagram of a computer system upon which the embodiments of the invention can be practised.

The process for constructing a runtime symbol table according to the first embodiment of the invention can be implemented using a computer program product in conjunction with a computer system 300 as shown in FIG. 3. In particular, the control module 366 can be implemented as software, or computer readable program code, executing on the computer system 300.

The computer system 300 includes a computer 350, a video display 310, and input devices 330, 332. In addition, the computer system 300 can have any of a number of other output devices including line printers, laser printers, plotters, and other reproduction devices connected to the computer 350. The computer system 300 can be connected to one or more other computers via a communication input/output (I/O) interface 364 using an appropriate communication channel 340 such as a modem communications path, an electronic network, or the like. The network may include a local area network (LAN), a wide area network (WAN), an Intranet, and/or the Internet 320.

The computer 350 includes the control module 366, a memory 370 that may include random access memory (RAM) and read-only memory (ROM), input/output (I/O) interfaces 364, 372, a video interface 360, and one or more storage devices generally represented by the storage device 362. The control module 366 is implemented using a central processing unit (CPU) that executes or runs a computer readable program code that performs a particular function or related set of functions.

The video interface 360 is connected to the video display 310 and provides video signals from the computer 350 for display on the video display 310. User input to operate the computer 350 can be provided by one or more of the input devices 330, 332 via the I/O interface 372. For example, a user of the computer 350 can use a keyboard as I/O interface 330 and/or a pointing device such as a mouse as I/O interface 332. The keyboard and the mouse provide input to the computer 350. The storage device 362 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 350 is typically connected to other devices via a bus 380 that in turn can consist of data, address, and control buses.

The method steps for constructing a runtime symbol table for a computer program are effected by instructions in the software that are carried out by the computer system 300. Again, the software may be implemented as one or more modules for implementing the method steps.

In particular, the software may be stored in a computer readable medium, including the storage device 362 or that is downloaded from a remote location via the interface 364 and communications channel 340 from the Internet 320 or another network location or site. The computer system 300 includes the computer readable medium having such software or program code recorded such that instructions of the software or the program code can be carried out. The use of the computer system 300 preferably effects advantageous apparatuses for constructing a runtime symbol table for a computer program in accordance with the embodiments of the invention.

The computer system 300 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 366. Intermediate storage of the program code and any data including entities, tickets, and the like may be accomplished using the memory 370, possibly in concert with the storage device 362.

In some instances, the program may be supplied to the user encoded on a CD-ROM or a floppy disk (both generally depicted by the storage device 362), or alternatively could be read by the user from the network via a modem device connected to the computer 350. Still further, the computer system 300 can load the software from other computer readable media. This may include magnetic tape, a ROM or integrated circuit, a magneto-optical disk, a radio or infrared transmission channel between the computer and another device, a computer readable card such as a PCMCIA card, and the Internet 320 and Intranets including email transmissions and information recorded on Internet sites and the like. The foregoing are merely examples of relevant computer readable media. Other computer readable media may be practised without departing from the scope and spirit of the invention.

In the foregoing manner, a method, an apparatus, and a computer program product for constructing a runtime symbol table for a computer program are disclosed. While only a small number of embodiments are described, it will be apparent to those skilled in the art in view of this disclosure that numerous changes and/or modifications can be made without departing from the scope and spirit of the invention.

I claim:

1. A method for constructing a runtime symbol table for a computer program, said method including the steps of:

initializing a symbol table, by a compiler, for storing one or more entities E;

adding into said symbol table, by the compiler, tickets V for the respective entities E, wherein the adding of a ticket $V_i$ for an entity $E_i$ includes the steps of:

inserting an offset address $S_i$ by the compiler, the offset address $S_i$ being located in the ticket $V_i$ after a predefined token, wherein the offset address $S_i$ defines a location of a character position in the symbol table immediately following the token, the location being defined with respect to the symbol table itself; and inserting a preassigned, memory system address in said symbol table by the compiler if the entity $E_i$ for the ticket $V_i$ has such a preassigned address at compile time, wherein adding $S_i$ to a runtime address of the symbol table provides an address where $S_i$ is actually stored in memory at runtime so that $S_i$ serves as a marker from which a runtime system can search for a runtime address of $E_i$.

2. The method according to claim 1, wherein said symbol table is a string of characters.

3. The method according to claim 1, wherein said adding step further includes the step of searching said symbol table to determine if said symbol table already contains an entity.

4. The method according to claim 3, wherein said adding step further includes the steps of creating a ticket and concatenating said ticket with said symbol table.

5. The method according to claim 4, wherein said adding step further includes the step of generating placeholders for each ticket to store incomplete information in said symbol table.

6. The method according to claim 1, further including the step of, before said adding step, mapping an entity name for each of one or more entities having the same entity name as another entity name into a unique entity name for placement in said symbol table.

7. The method according to claim 6, wherein said mapping is performed by a precompiler.

8. The method according to claim 1, wherein each entity is selected from the group consisting of:

a constant;

a variable;

a pointer;

a function name;

a procedure name.

9. The method according to claim 1, wherein each ticket includes an entity name and at least one tagged address.

10. The method according to claim 9, wherein said ticket further includes at least one tag for specifying information regarding said corresponding entity.

11. The method according to claim 9, wherein said at least one tagged address is selected from the group consisting of an entity home address, an entity offset address, and a copied address.

12. The method according to claim 9, wherein said at least one tagged address can be allocated dynamically by a runtime system.

13. The method according to claim 12, further including the step of copying a tagged address in a ticket of an entity to enable optimisation of memory accesses of said entity.

14. The method according to claim 1, further including the step of generating an error message using said runtime symbol table when an error occurs.

15. An apparatus for constructing a runtime symbol table for a computer program, said apparatus including:

means for initializing a symbol table, by a compiler, for storing one or more entities E;

means for adding into said symbol table, by the compilers, tickets V for the respective entities E, wherein the adding of a ticket $V_i$ for an entity $E_i$ includes the steps of:

means for inserting an offset address $S_i$ by the compiler, the offset address $S_i$ being located in the ticket $V_i$ after a predefined token, wherein the offset address $S_i$ defines a location of a character position in the symbol table immediately following the token, the location being defined with resect to the symbol table itself; and means for inserting a preassigned, memory system address in said symbol table by the compiler if the entity $E_i$ for the ticket $V_i$ has such a preassigned address at compile time, wherein adding $S_i$ to a runtime address of the symbol table provides an address where $S_i$ is actually stored in memory at runtime so that $S_i$ serves as a marker from which a runtime system can search for a runtime address of $E_i$.

16. The apparatus according to claim 15, wherein said symbol table is a string of characters.

17. The apparatus according to claim 15, wherein said adding means further includes means for searching said symbol table to determine if said symbol table already contains an entity.

18. The apparatus according to claim 15, wherein said adding means further includes means for creating a ticket and concatenating said ticket with said symbol table.

19. The apparatus according to claim 18, wherein said adding means further includes means for generating placeholders for each ticket to store incomplete information in said symbol table.

20. The apparatus according to claim 15, further including means for, before said adding step, mapping an entity name for each of one or more entities having the same entity name as another entity name into a unique entity name for placement in said symbol table.

21. The apparatus according to claim 20, wherein said mapping is performed by a precompiler.

22. The apparatus according to claim 15, wherein each entity is selected from the group consisting of:

a constant;

a variable;

a pointer;

a function name;

a procedure name.

23. The apparatus according to claim 15, wherein each ticket includes an entity name and at least one tagged address.

24. The apparatus according to claim 23, wherein said ticket further includes at least one tag for specifying information regarding said corresponding entity.

25. The apparatus according to claim 23 wherein said at least one tagged address is selected from the group consisting of an entity home address, an entity offset address, and a copied address.

26. The apparatus according to claim 23, wherein said at least one tagged address can be allocated dynamically by a runtime system.

27. The apparatus according to claim 26, further including means for copying a tagged address in a ticket of an entity to enable optimisation of memory accesses of said entity.

28. The apparatus according to claim 15, further including means for generating an error message using said runtime symbol table when an error occurs.

29. A computer program product having a computer readable medium having a computer program recorded therein for constructing a runtime symbol table for a computer program, said computer program product including:

computer program code means for initializing a symbol table, by a compilers, for storing one or more entities E;

computer program code means for adding into said symbol table, by the compiler, tickets V for the respective entities E, wherein the adding of a ticket $V_i$ for an entity $E_i$ includes the steps of:

computer program code means for inserting an offset address $S_i$ by the compiler, the offset address $S_i$ being located in the ticket $V_i$ after a predefined token, wherein the offset address $S_i$ defines a location of a character position in the symbol table immediately following the token, the location being defined with respect to the symbol table itself; and computer program code means for inserting a preassigned, memory system addresses in said symbol table by the compiler if the entity $E_i$ for the ticket $V_i$ has such a preassigned address at compile time, wherein adding $S_i$ to a runtime address of the symbol table provides an address where $S_i$ is actually stored in memory at runtime so that $S_i$ serves as a marker from which a runtime system can search for a runtime address of $E_i$.

30. The computer program product according to claim 29, wherein said symbol table is a string of characters.

31. The computer program product according to claim 29, wherein said computer program code means for adding further includes computer program code means for searching said symbol table to determine if said symbol table already contains an entity.

32. The computer program product according to claim 29, wherein said computer program code means for further adding includes computer program code means for creating a ticket and concatenating said ticket with said symbol table.

33. The computer program product according to claim 32, wherein said adding means further includes means for generating placeholders for each ticket to store incomplete information in said symbol table.

34. The computer program product according to claim 29, further including computer program code means for, before adding, mapping an entity name for each of one or more entities having the same entity name as another entity name into a unique entity name for placement in said symbol table.

35. The computer program product according to claim 34, wherein said mapping is performed by a precompiler.

36. The computer program product according to claim 29, wherein each entity is selected from the group consisting of:
- a constant;
- a variable;
- a pointer;
- a function name;
- a procedure name.

37. The computer program product according to claim 29, wherein each ticket includes an entity name and at least one tagged address.

38. The computer program product according to claim 37, wherein said ticket further includes at least one tag for specifying information regarding said corresponding entity.

39. The computer program product according to claim 37, wherein said at least one tagged address is selected from the group consisting of an entity home address, an entity offset address, and a copied address.

40. The computer program product according to claim 37, wherein said at least one tagged address can be allocated dynamically by a runtime system.

41. The computer program product according to claim 40, further including computer program code means for copying a tagged address in a ticket of an entity to enable optimisation of memory accesses of said entity.

42. The computer program product according to claim 29, further including computer program code means for generating an error message using said runtime symbol table when an error occurs.

43. A method of operating a runtime system, said method including the steps of:
- loading a computer program having an associated runtime symbol table, said runtime symbol table containing compiler-composed tickets V for respective entities E of said computer program, a ticket $V_i$ for an entity $E_i$ including at least an offset address $S_i$, the offset address $S_i$ being located in the ticket $V_i$ after a predefined token, wherein the offset address defines a location of a character position in the symbol table immediately following the token, the location being defined with respect to the symbol table itself;
- allocating a memory address for said entity at runtime, including the steps of:
  - adding $S_i$ to a runtime address of the symbol table to obtain an address where $S_i$ is actually stored in memory at runtime; and
  - searching for a runtime address of $E_i$ using $S_i$ as a marker; and
- recording said allocated memory address in said ticket at runtime.

44. The method according to claim 43, wherein said symbol table is a string of characters for storing information about said at least one entity, said ticket of each of said at least one entity including an offset address after a predefined token.

45. The method according to claim 44, wherein said each ticket includes one or more placeholders for storing incomplete information in said symbol table.

46. The method according to claim 43, further including the step of generating a unique entity name for each like named entity in said computer program before entering said entity in said symbol table.

47. The method according to claim 43, wherein each entity is selected from the group consisting of:
- a constant;
- a variable;
- a pointer;
- a function name;
- a procedure name.

48. The method according to claim 43, wherein each ticket includes an entity name and at least one tagged address, and at least one tag for specify information regarding said corresponding entity.

49. An apparatus for operating a runtime system, said apparatus including:
- means for loading a computer program having an associated runtime symbol table, said runtime symbol table containing compiler-composed tickets V for respective entities E of said computer program, a ticket $V_i$ for an entity $E_i$ including at least an offset address $S_i$, the offset address $S_i$ being located in the ticket $V_i$ after a predefined token, wherein the offset address $S_i$ defines a location of a character position in the symbol table immediately following the token, the location being defined with respect to the symbol table itself;
- means for allocating a memory address for said entity $E_i$ at runtime comprising:
  - means for adding $S_i$ to a runtime address of the symbol table to obtain an address where $S_i$ is actually stored in memory at runtime; and
  - means for searching for a runtime address of $E_i$ using $S_i$ as a marker; and
- means for recording said allocated memory address in said ticket at runtime.

50. The apparatus according to claim 49, wherein said symbol table is a string of characters for storing information about said at least one entity, said ticket of each of said at least one entity including an offset address after a predefined token.

51. The apparatus according to claim 50, wherein said each ticket includes one or more placeholders for storing incomplete information in said symbol table.

52. The apparatus according to claim 49, further including means for generating a unique entity name for each like named entity having the same scope in said computer program before entering said entity in said symbol table.

53. The apparatus according to claim 49, wherein each entity is selected from the group consisting of:
- a constant;
- a variable;
- a pointer;
- a function name;
- a procedure name.

54. The apparatus according to claim 49, wherein each ticket includes an entity name and at least one tagged address, and at least one tag for specifying information regarding said corresponding entity.

55. A computer program product having a computer readable medium having a computer program recorded therein for operating a runtime system, said computer program product including:
- computer program code means for loading a computer program having an associated runtime symbol table, said runtime symbol table containing compiler-composed tickets V for respective entities E of said computer program, a ticket $V_i$ for an entity $E_i$ including at least an offset address $S_i$, the offset address $S_i$ being located in the ticket after a predefined token, wherein the offset address $S_i$ defines a location of a character position in the symbol table immediately following the token, the location being defined with respect to the symbol table itself;

computer program code means for allocating a memory address for said entity $E_i$ at runtime comprising:

means for adding $S_i$ to a runtime address of the symbol table to obtain an address where $S_i$ is actually stored in memory at runtime; and means for searching for a runtime address of $E_i$ using $S_i$ as a marker; and recording said allocated memory address in said ticket at runtime.

56. The computer program product according to claim 55, wherein said symbol table is a string of characters for storing information about said at least one entity, said ticket of each of said at least one entity including an offset address after a predefined token.

57. The computer program product according to claim 55, wherein said each ticket includes one or more placeholders for storing incomplete information in said symbol table.

58. The computer program product according to claim 55, further including computer program code means for generating a unique entity name for each like named entity having the same scope in the computer program before entering said entity in said symbol table.

59. The computer program product according to claim 55, wherein each entity is selected from the group consisting of:
a constant;
a variable;
a pointer;
a function name;
a procedure name.

60. The computer program product according to claim 55, wherein each ticket includes an entity name and at least one tagged address, and at least one tag for specifying information regarding said corresponding entity.

* * * * *